Jan. 10, 1939. J. D. SCAIFE 2,143,716
ELECTRICALLY OPERATED STOP MECHANISM
Filed Aug. 24, 1937 2 Sheets-Sheet 1
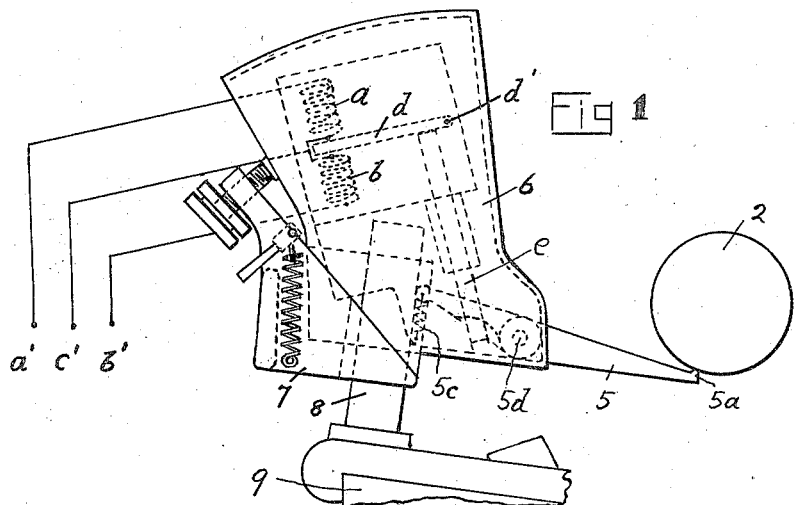
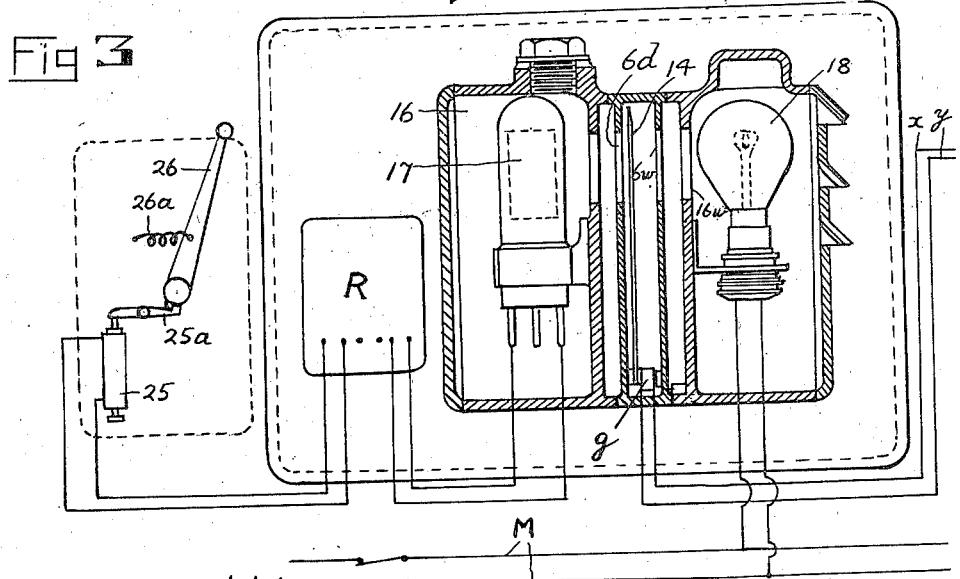
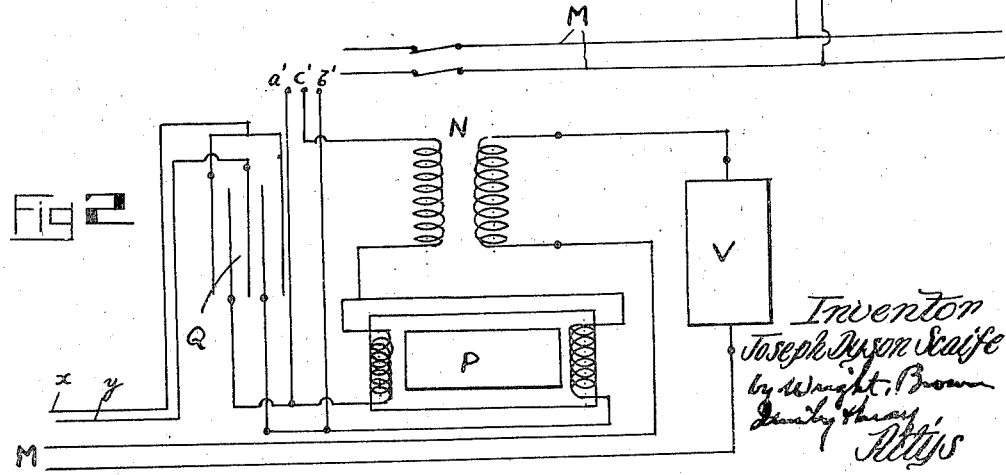
Inventor
Joseph Dyson Scaife Jan. 10, 1939.  J. D. SCAIFE  2,143,716

ELECTRICALLY OPERATED STOP MECHANISM

Filed Aug. 24, 1937  2 Sheets-Sheet 2

Inventor
Joseph Dyson Scaife
by Wright, Brown, Quinby & Nay
Attys.

Patented Jan. 10, 1939

2,143,716

UNITED STATES PATENT OFFICE 2,143,716

ELECTRICALLY OPERATED STOP MECHANISM

Joseph Dyson Scaife, Cross Hills, near Keighley, England, assignor of one-half to John Lund Limited, Eastburn, near Keighley, England Application August 24, 1937, Serial No. 160,634
In Great Britain August 31, 1936

1 Claim. (Cl. 192—125)

This invention has reference to electrically operated stop mechanism whereby the actions of a grinding machine or other machine tool may be automatically arrested when the work being performed by the machine tool has progressed to reach a predetermined stage in order that all said actions of the tool upon the work may be repeatedly executed or finished with the greatest precision in each case within periods of considerable duration.

In the use of this type of precision mechanism for effecting or carrying out such functions as are described in the specification of my U. S. application, Patent No. 2,091,527, granted August 31, 1937, I have found that in certain cases the vibratory actions or somewhat rough usage to which same (and the apparatus in connection therewith) have been subjected have tended to interfere with the delicacy of its precision. For this reason, according to my present invention, I separate those members of my present apparatus (which are more affected by said vibrations and rough usage) from the other parts which may be of a firmer and more durable character, in order that the former may be situated and supported in an isolated position (such as on a wall or other structure), while the latter may be supported by the framework of the machine where its detecting functions are performed.

In order that my invention may be more readily understood, I have hereunto appended sheets of drawings, in which:—

Fig. 1 is a side elevation illustrating part of my apparatus.

Fig. 2 is a diagrammatical illustration of the electrical connections from the parts shown by Fig. 1.

Fig. 3 is an illustration, partly diagrammatical, of the electrical connections and apparatus to which the devices shown by Fig. 2 are connected.

Figure 5:
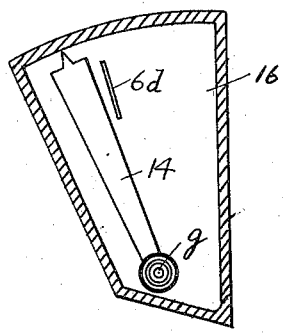
Fig. 5 is a sectional end elevation taken on line A—A of Fig. 4.
Figure 4:
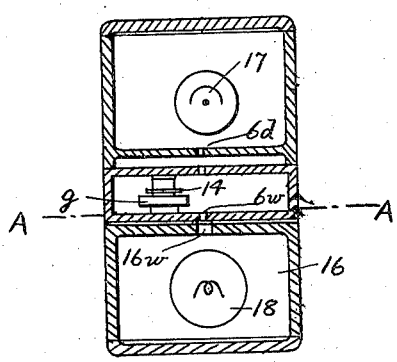
Fig. 4 is a sectional plan of certain of the parts shown by Fig. 3.

To explain the carrying out of my invention I will follow my former specification and describe its use as applied to a metal grinding machine, since from such explanation its essential features will be disclosed.

As in my former apparatus I again make use of the diamond or hardened metal contacting surface $5a$ to be mounted upon a lever 5 which by a counterbalancing spring $5c$ is urged to follow the gradually receding surface of the member 2 that is being ground or cut down to the required extent.

This lever 5 is pivoted at $5d$ on bearings supported by a bracket 7 adjustably mounted on a pillar 8 fixed to the machine's framework 9 to support part of my devices hereinafter described. The bracket 7 also supports a casing 6 within which I mount the two coils $a$ and $b$ which are electrically balanced, and from the said coils I take leads $a^1$, $b^1$ and $c^1$ to a remotely situated galvanometer $g$.

The coils $a$ and $b$ have mounted between them an armature $d$ pivoted at $d^1$, and when said armature is in a central position no current will be flowing to the galvanometer and therefore a zero reading will be indicated. However, I arrange said armature to be moved from its central position by a member $e$ which is slid longitudinally by the detector-carrying-lever 5 as the detector moves according to the receding surface of the work or article being ground or cut away.

On the armature $d$ approaching the coil $b$ the pointer 14 of the galvanometer $g$ will be gradually moved from the zero position and as it thus moves it will approach and reach the adjusted point where the work being done has brought the article 2 down to the desired size or diameter, and at this point the pointer of the galvanometer is made to shut-off the light from a lamp 18 to a photo-electric cell 17 and so through the relay apparatus R bring about the stoppage of the machine by energizing the electro-magnet 25 to operate the trip lever $25a$ and allow the spring $26a$ to move the control lever 26 as desired.

The lamp 18, galvanometer $g$ and photo-electric-cell 17 are mounted with their respective parts of the casing 16 which may be fixed to the wall or other support, while a further casing 20 may also include the relay apparatus R so that all these parts may be remote from the detector member and the machine upon which it is mounted.

The actions of the pointer 14 are similar to those of my former apparatus. That is, by interrupting the ray of light from the lamp 18 through the slots $16w$, $6w$ and $6d$ to the cell 17 to cause a change of current through the cell which on amplification will operate the electro-magnet 25.

In order that the apparatus may be operated from the supply mains I arrange the connections as shown in Fig. 2, in which M represents alternating-current mains-leads and N and P are transformers with a voltage regulator V mounted in one of the leads. The device shown at Q is a rectifier to convert to direct-current, the current passing along the leads $x$ and $y$ to the galvanometer $g$, as shown by Fig. 3.

Figure 6:
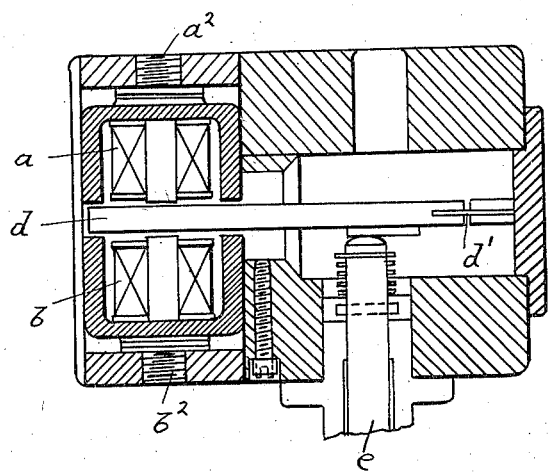
Fig. 6 is a sectional elevation of certain parts of the devices shown by Fig. 1 and is drawn to an enlarged scale.

The method of mounting the coils $a$ and $b$ and their operating parts is more clearly shown in Fig. 6, the armature $d$ being shown in the position where zero is indicated, while the adjusting screws for balancing the coils are shown at $a^2$ and $b^2$.

Such being the nature of my said invention, what I claim is:

In electrically operated stop mechanism of the type described, a device actuable to stop a machine, a detector member for contact with the work, an electric circuit including a pair of normally balanced coils, an armature between said coils movable by said detector to unbalance the coils, a lamp remote from said detector and coils, a photo-electric cell arranged to receive a beam of light from said lamp, a screen movable into a position to intercept said beam, a galvanometer responsive to unbalancing of said coils to move said screen into intercepting position, and means including said cell and a relay for actuating said stopping device in response to change of current through said cell.

JOSEPH DYSON SCAIFE.